United States Patent
Spörl et al.

(10) Patent No.: US 7,130,732 B2
(45) Date of Patent: Oct. 31, 2006

(54) CONTROL METHOD FOR PREVENTING ENGINE SPEED DECREASE WHEN CLOSING THE LOCKUP CLUTCH OF A TORQUE CONVERTER OF A CONTINUOUSLY VARIABLE TRANSMISSION

(75) Inventors: Peter Spörl, Ravensburg (DE); Tim Sargent, D-Loveland, OH (US); Oliver Iden, Weissensberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 89 days.

(21) Appl. No.: 10/970,109

(22) Filed: Oct. 21, 2004

(65) Prior Publication Data

US 2005/0085982 A1    Apr. 21, 2005

(30) Foreign Application Priority Data

Oct. 21, 2003    (DE) .................................. 103 48 763

(51) Int. Cl.
    *G06F 7/00*    (2006.01)

(52) U.S. Cl. .............................. 701/54; 701/51; 477/77
(58) Field of Classification Search ................. 701/51, 701/52, 54, 67, 100, 101; 477/39, 43, 77
    See application file for complete search history.

(56) References Cited

U.S. PATENT DOCUMENTS 4,860,613 A * 8/1989 Hall et al. .................... 475/23
6,066,069 A    5/2000 Vorndran

FOREIGN PATENT DOCUMENTS

| DE | 196 40 160 A1 | 4/1998 |
| DE | 198 06 760 A1 | 8/1998 |
| EP | 0 916 043 B1 | 12/2000 |

* cited by examiner

*Primary Examiner*—Gertrude A. Jeanglaude
(74) *Attorney, Agent, or Firm*—Davis & Bujold, P.L.L.C.

(57) ABSTRACT

Within the framework of the method for the prevention of a decreasing rotary speed of a motor by the closing of a converter clutch during a constant gas pedal positioning in a continuously automatic transmission with a variator and a hydrodynamic converter, a decreasing motor speed of rotation is avoided by an increase of the speed of rotation of the primary disk of the variator (turbine).

6 Claims, 2 Drawing Sheets

CONTROL METHOD FOR PREVENTING ENGINE SPEED DECREASE WHEN CLOSING THE LOCKUP CLUTCH OF A TORQUE CONVERTER OF A CONTINUOUSLY VARIABLE TRANSMISSION

This application claims priority from German Application Serial. No. 103 48 763.8 filed Oct. 21, 2003.

FIELD OF THE INVENTION

A method for preventing engine speed decrease when closing the lockup clutch of a torque converter in a continuously variable transmission, wherein the transmission has a hydrodynamic torque converter.

BACKGROUND OF THE INVENTION

Since the introduction of the automatic, or the stepless transmission, hydrodynamic torque converters have been the connecting link between a driving motor and the true transmission gear train. A torque converter enables, first, a comfortable and jerk-free travel through a slip range and simultaneously damps lapses of rotational uniformity of the internal combustion motor. Second, the basic principal of torque maximizing makes available a substantial torque for startup.

In accordance with the state of the technology, a hydrodynamic torque converter consists of a pump impeller, a turbine gear, the reaction member (guide rod, stator) and the necessary oil for torque transmission.

With the present state of the technology, torque converters are known which incorporate a converter bypass clutch and a primary clutch, whereby the primary clutch (PK) shifts between the motor and the converter and the converter bypass clutch operates between the motor and the transmission.

EP 09 16 043, of the Applicant discloses a control system for a continuous transmission with a torque converter and a converter bypass clutch, wherein the control of the converter bypass clutch follows a strategy in which the torque converter is considered to be a hydrodynamic variator in a series connection with the continuous transmission and the shift in or shift out of the converter bypass clutch, is exclusively a function of rotational speed of the motor. Thereby, particularly, an excessive turning speed of the motor upon the starting operation and a decrease of rotational speed during tractive running are to be avoided.

Upon the closing of the converter bypass clutch, that is to say, upon the connection of the motor with the transmission, the motor rotational speed would normally decrease even with a constant pressure on the gas pedal. This is an unexpected event for the driver and the riding comfort is impaired.

The present invention has the purpose of making a method available for the prevention of a decreasing motor rotational speed upon the closing of the torque converter clutch in a continuously variable transmission with a variator and a hydrodynamic torque converter in order that, in this manner, the stated disadvantages of the state of the technology are avoided and the comfort of the driver is increased.

SUMMARY OF THE INVENTION

In accordance with this purpose, the proposal is to avoid a decreasing rotational speed of a motor upon a constant gas pedal positioning by means of an increase in the rotational speed of the primary disk of the variator (turbine).

In particular, proposed is that at the beginning of the closing of the converter clutch, attention should be given to the difference $n_{diff}$ between the rotational speed of the motor $n_{mot}$ and the rotational speed of the turbine, namely $n_t$. This $n_{diff}$ is termed "offset" and is added to the speed of rotation of the primary disk of the variator. (Variator=turbine.) The idea is an increase of the rotational speed of the primary disk, i.e., the turbine, by the amount of the offset. Thereby, in a simple manner, assurance is given that the speed of rotation of the motor remains constant before and after the closing of the torque converter clutch.

The possibility also exists that with dependency on the desired driving strategy, the speed of rotation of the primary disk is increased by a calibrated percentile portion of the difference $n_{diff}$ between the speed of rotation of the motor $n_{mot}$ and the speed of rotation of the turbine $n_t$.

In accordance with the invention, for example, an inventive increase of the speed of rotation of the primary disk cannot take place within the framework of an effective driving strategy if the gas pedal degree of depression takes on values, which correspond to a method of driving which would represent a consumption-saving method of driving. Further, an increase is not necessary, if the driver's inclination is to floor the gas pedal since, in this case, the primary disk speed of rotation is climbing at such a rate that the motor speed of rotation is not reduced during closing procedure of the converter clutch.

BRIEF DESCRIPTION OF THE DRAWINGS

The invention will now be described, by way of example, with reference to the accompanying drawings in which.

DETAILED DESCRIPTION OF THE INVENTION

Figure 1:
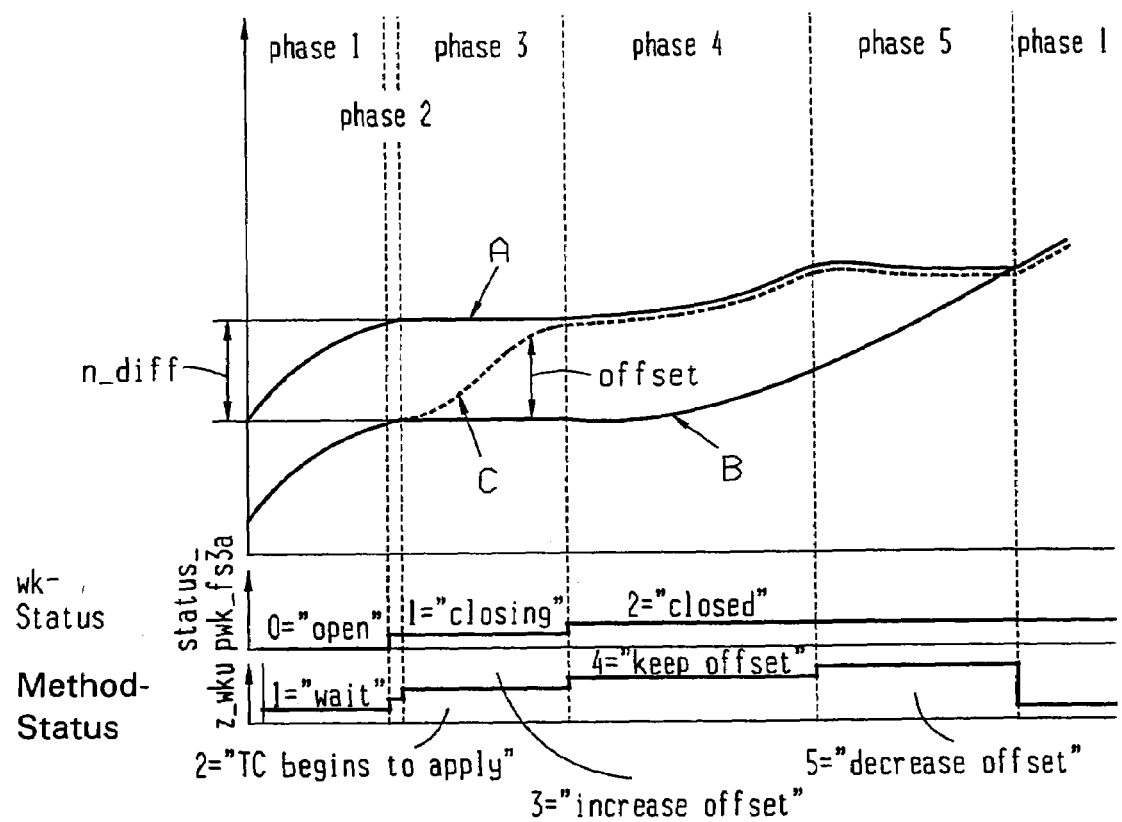
FIG. 1 shows a diagram, which presents the principle of the invented method.
Figure 2:
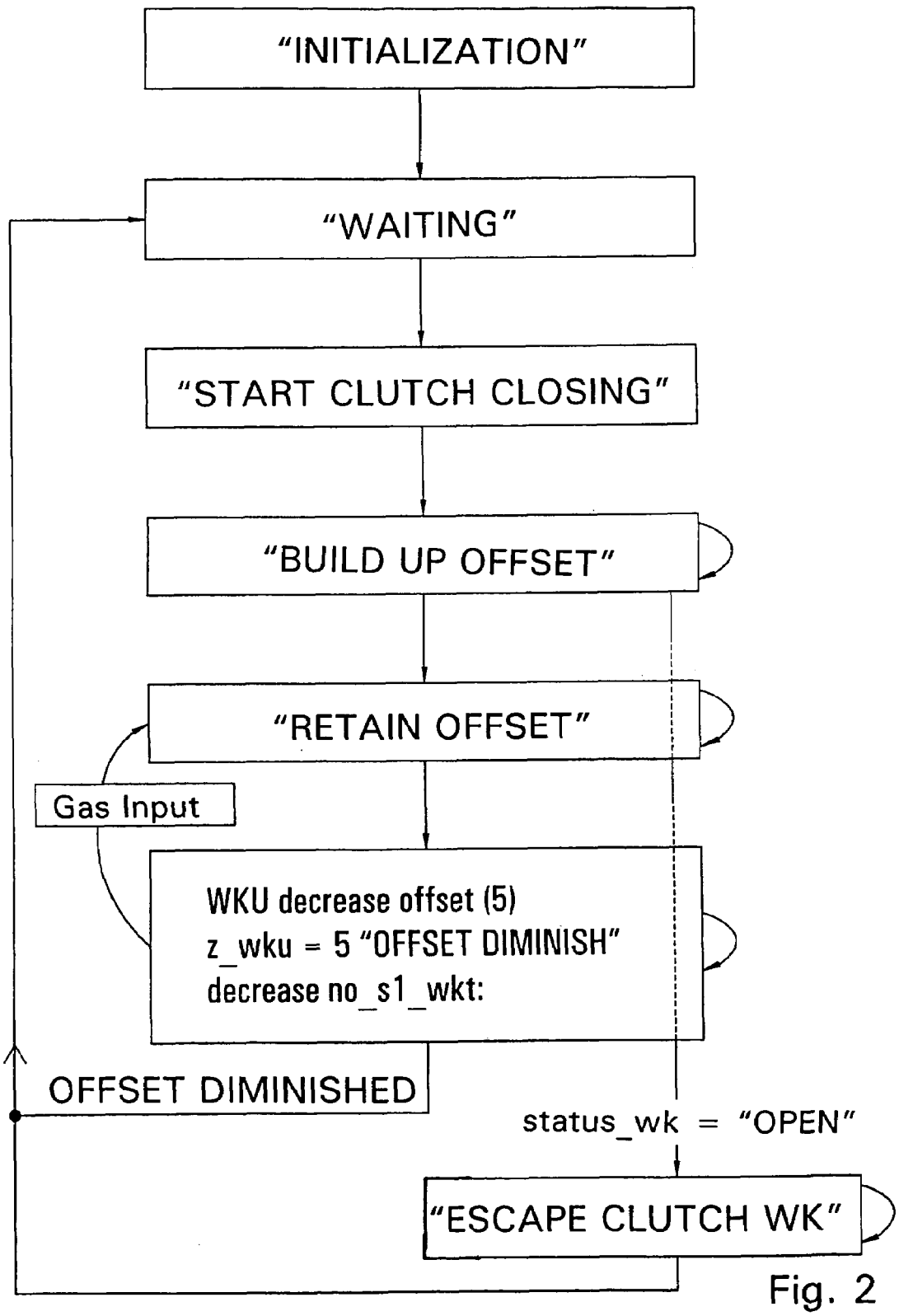
FIG. 2 shows a block diagram of individual steps of the invented method.

In FIGS. 1 and 2, the method comprises five phases which, especially in FIG. 2, are outlined in a block diagram. The Initializing is carried out by an activated primary disk speed of rotation increasing function, whereby the method is carried out only in a drive-mode and not in a physical gas pedal pressing mode. A further condition is that the drive conditions are not of a special nature, that is to say, that no special driving strategy program is in progress.

After the initialization, there follows the first phase, which is the wait-phase. In a second phase (determination of the difference in speeds of rotation), the speed of rotation difference $n_{diff}$ between the motor speed of rotation $n_{mot}$ and the turbine rotational speed $n_t$ (the turbine speed of rotation being the primary disk speed of rotation) is determined and saved and the closing procedure of the converter clutch is started.

In a third phase (increase phase), the speed of rotation of the primary disk of the variator is increased by the approximate quantity of an offset, which represents a calibrated percentile apportionment of the rotational speed difference, namely, $n_{diff}$ at the beginning of the closing procedure. This phase is terminated when the speed of rotation of the primary disk of the variator has been actually increased approximately the value of the offset or if the closing procedure of the torque converter clutch is shutoff.

In the fourth phase (the holding phase), the offset is held constant up to that point in time at which the driver releases the input of gas. The offset diminishes in the fifth phase, whereby the speed of the diminishment of the offset is determined by the manner in which the driver reduces the rate of the delivery of gas relative to the gas pedal positioning as this is compared to the gas pedal positioning at the end of the third phase. The greater the difference, just so much greater is the speed of the diminishment.

If the driver desires to accelerate, that is to say, feed gas to the motor, then the fifth phase is extinguished and retraction is made back into the fourth phase whereby the actual offset is retained.

When the offset is fully diminished, then the method is ended and returns to the waiting phase.

The function is abandoned, if the converter clutch is opened. According to the invention, the offset is quickly diminished to zero when the converter clutch, during the third, fourth or fifth phase, is opened. These phases are diagramed in FIG. 1.

In FIG. 1, the curve of the motor speed of rotation $n_{mot}$ and the turbine speed of rotation $n_t$ during the phases of the progress of the method is presented. In this diagram, curve A represents the course of the motor rotational speed; curve B, the course of the turbine rotational speed without the invented increase of the speed of rotation and, curve C, shows the track of the turbine speed of rotation in accordance with the invention. Moreover, in FIG. 1, the offset is indicated, along with the difference in speeds of rotation, namely $n_{diff}$.

In the underpart of the diagram is shown the converter clutch WK status with the conditions "open", "closing" and "closed". Further shown here are the status or phases of the invented method these being Wait, Offset-increase, Offset-keeping, and Offset-decrease.

By means of the conception, according to the invention, the converter clutch can be closed without a therewith connected diminishment of the speed of rotation of the motor. Further, a drop in the speed of rotation of the motor is still only dependent upon the desire of the driver, that is, on the position of the gas pedal.

The invention claimed is:

1. A method for preventing a rotary speed decrease of a motor when engaging a converter clutch of a torque converter during constant gas pedal positioning in a continuously variable transmission with a variator and a hydrodynamic converter, and avoiding a motor rotary speed decrease by an increase in a speed of rotation of a primary disk of the variator, the method comprising the steps of:
   activating a waiting phase,
   determining and storing, during a determine a difference in rotational speeds phase where an engaging procedure starts, a difference $n_{diff}$ between a motor speed of rotation $n_{mot}$ and the speed of rotation $n_t$ of the primary disc (second phase),
   increasing, during an increase phase, the speed of rotation of the primary disk of the variator by an offset, which corresponds to a calibrated percentile portion of the speed of rotation difference $n_{diff}$ at a beginning of the engaging procedure (third phase),
   holding, during a holding phase, the offset constant up to the point in time at which a driver removes an input of gas, and
   diminishing, during an offset decrease phase, the offset with a speed of the diminishment of the offset being determined by a speed by which the driver lessens the input of the gas, in dependency of a gas pedal positioning when compared to the gas pedal positioning at an end of a fourth phase (this being the fifth phase), and
   diminishing the offset to zero when the converter clutch, during at least one of a third phase, the fourth phase and a fifth phase is disengaged.

2. The method according to claim 1, further comprising the step terminating the increase phase when at least one of the speed of rotation of the primary disk of the variator is actually increased about the value of the offset and when the engaging procedure of the converter clutch is interrupted.

3. The method according to claim 1, further comprising the step of, when the driver elects to increase gas inflow, extinguishing the fifth phase and activating the fourth phase, whereby an actual offset is retained.

4. The method according to claim 1, further comprising the step of terminating the method, when the offset is completely diminished, and reactivating the waiting phase.

5. The method according to claim 1, further comprising the step of quickly reducing the offset to zero when the converter clutch is disengaged during one of the third phase, the fourth phase and the fifth phase.

6. A method for preventing a rotary speed decrease of a motor, having a variator and a hydrodynamic converter, during engagement a clutch of a torque converter during constant gas pedal positioning so as to avoid a motor rotary speed decrease, the method comprising the steps of:
   activating a waiting phase,
   determining and storing when a clutch engaging procedure starts, during a determine difference in rotational speed phase, a difference $n_{diff}$ between a motor speed of rotation $n_{mot}$ and the speed of rotation $n_t$ of a primary disc of the variator (second phase),
   increasing, during an increase phase, the speed of rotation of the primary disk of the variator by an offset amount which corresponds to a calibrated percentile portion of the speed of rotation difference $n_{diff}$ at a beginning of the clutch engaging procedure (third phase),
   holding the offset constant, during a holding phase, until a driver removes a gas input; and
   diminishing the offset, during an offset decrease phase, at an offset diminishment speed determined by a speed by which the driver removes the gas input; and
   diminishing the offset to zero if the clutch is disengaged after the third phase.

* * * * *